(No Model.) 2 Sheets—Sheet 2.
G. BRUCE & C. L. VAN BUSKIRK.
FLOOD GATE.
No. 544,425. Patented Aug. 13, 1895.
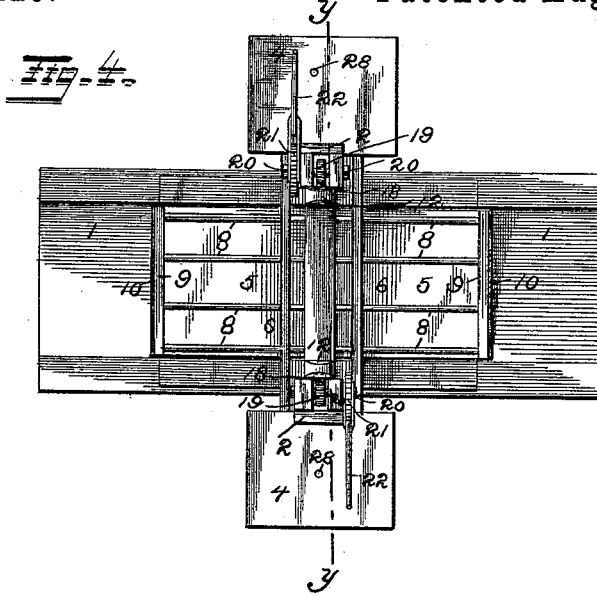
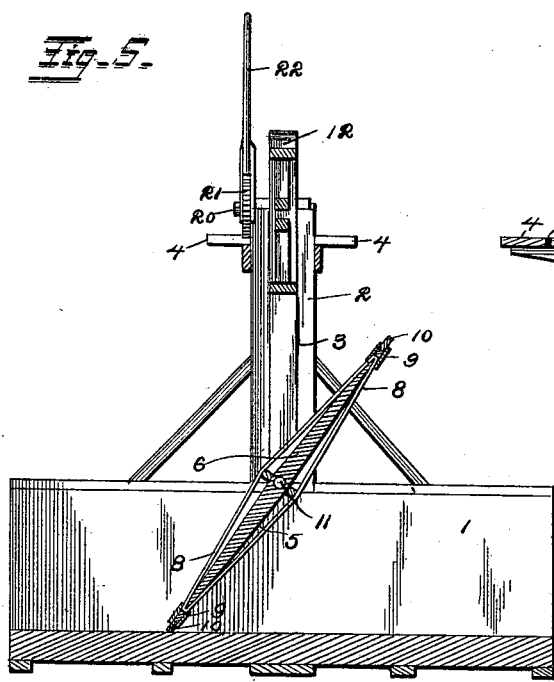
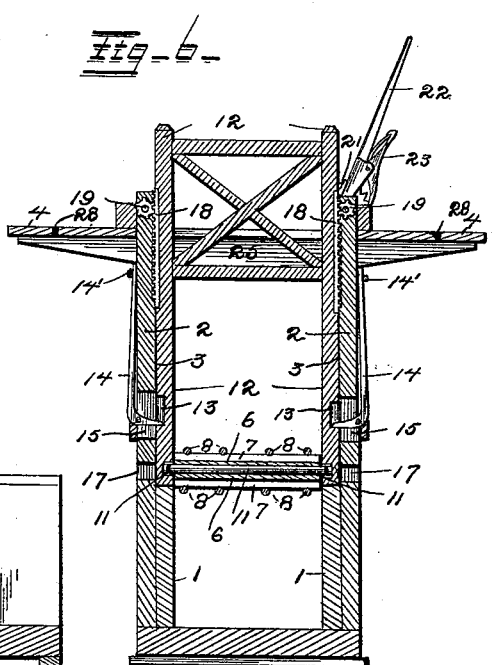
Witnesses
R. Herzog
J. P. Suit
Inventors
George Bruce
and
Charles L. Van Buskirk
By H. D. Wilson
Attorney

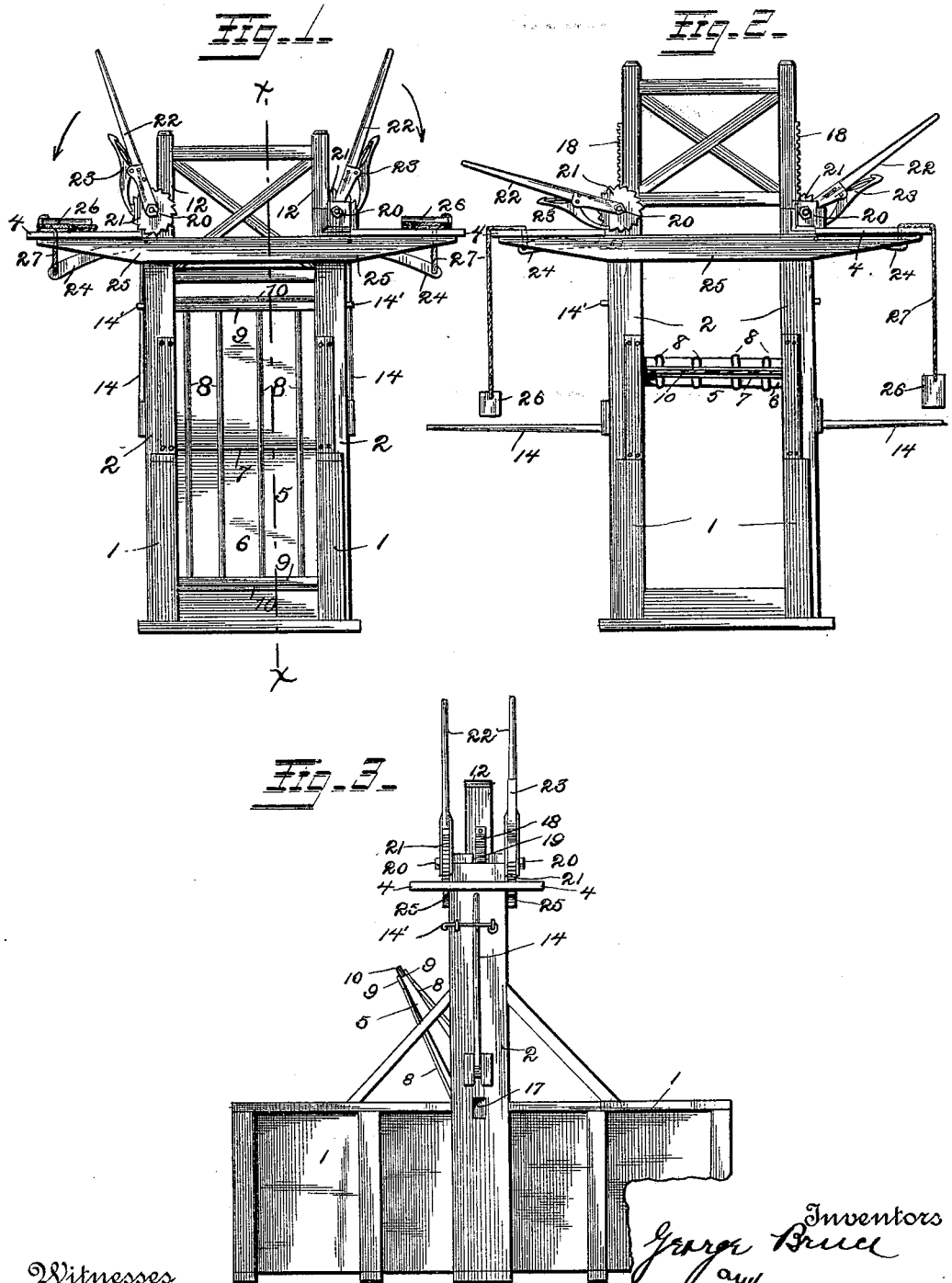

UNITED STATES PATENT OFFICE.

GEORGE BRUCE AND CHARLES L. VAN BUSKIRK, OF LODI, CALIFORNIA.

FLOOD-GATE.

SPECIFICATION forming part of Letters Patent No. 544,425, dated August 13, 1895.

Application filed December 27, 1894. Serial No. 533,045. (No model.)

*To all whom it may concern:*

Be it known that we, GEORGE BRUCE and CHARLES L. VAN BUSKIRK, citizens of the United States, residing at Lodi, in the county of San Joaquin and State of California, have invented certain new and useful Improvements in Flood-Gates; and we do declare the following to be a full, clear, and exact description of the invention, such as will enable others skilled in the art to which it appertains to make and use the same.

Our invention has relation to improvements in flood-gates, and among the objects in view is to provide an extremely simple, efficient, and readily-operated flood-gate adapted to hold water in check for certain lengths of time, whereby to enable logs to be floated down a stream when the water held in check is released, and our said invention is also applicable for other purposes—as, for instance, in irrigation, &c., where it is desirable to hold water in check for a certain length of time; and with the above and other objects in view our invention consists in the novel construction, arrangement, and combination of parts, as hereinafter fully described, illustrated in the drawings, and pointed out in the appended claims.

In the accompanying drawings, Figure 1 is a front elevation of our improved flood-gate and operating devices, showing the gate in its closed or lowered position. Fig. 2 is a similar view showing the gate in its raised position. Fig. 3 is a side view of the parts seen in Fig. 1. Fig. 4 is a plan view. Fig. 5 is a vertical sectional view on line $x\,x$, Fig. 4, of the parts as seen in Fig. 1. Fig. 6 is a similar section on the line $y\,y$ of Fig. 4.

In carrying out our invention we provide a suitably-constructed sluice 1, with which is adapted to co-operate the improved flood-gate presently described, and said sluice is provided upon opposite sides with the vertical guide-posts or uprights 2, which are recessed, as at 3, upon their inner faces. To the said uprights are secured, at a suitable height, platforms 4, upon each of which an operator is to stand while operating the gate.

5 indicates the flood-gate, the same being constructed of boards 6, arranged lengthwise of the gate and bolted to the centrally-arranged brace-pieces 7. The gate is tapered toward each end from the brace-pieces, whereby the gate is considerably strengthened at its center, at which point it is of greater thickness than at the ends. To still further strengthen the gate and avoid injury thereto by logs striking against the same, we provide brace-rods 8, which extend longitudinally of the gate and are secured at each end to transverse pieces 9 bolted to the boards of the gate.

Between the boards 6, around the edges of the gate, is bolted rubber belting 10, which is adapted to project beyond the edges of the gate and make a close fit with the sides and bottom of the sluice.

Passing through the gate is a shaft 11, and 12 are vertical uprights which fit and are adapted to be raised and lowered within the recesses 3 of the guide-standards 2, and 14 are angular levers pivotally mounted on the guide-standard and projecting through slots 15 therein, one end of said levers being adapted to engage with notches 13 in the uprights 12.

It will be observed that when the gate is in its lowered or closed position and the levers 14 are thrown upwardly into the position seen in Fig. 1 the short arms of the said levers will take into the notches 13 and thereby hold the gate firmly in its lowered position and prevent it from being swung on its shaft. When, however, the levers are swung downwardly so as to release the notches, the shaft and the gate hung thereon may be both raised and turned. The levers 14 may be held in their locking position by being confined within keepers 14', carried by the sides of the guide-standards. It may sometimes happen that the shaft will become jammed or the guides become clogged within the guide-standards, this being especially the case when the gate has been long unused, and to provide a means for loosening the parts to enable the gate to be readily raised and the same to turn upon its shaft we provide openings 17 in the guide-standards opposite the ends of the shaft, through which a suitable tool, such as a crowbar, may be inserted to pry upwardly against the ends of the shaft.

In order to provide means for raising and lowering the gate we employ the following-described means: Secured to the outer faces of the uprights 12 are vertically-arranged racks 18, with the teeth of which are adapted to engage the teeth of pinions or gear-wheels 19, mounted fixedly on horizontal shafts 20, which have their bearings in bearing-blocks secured to the upper ends of the guide-standards. One end of each of the shafts projects beyond the bearing-blocks and carries a ratchet-wheel 21, and straddling said ratchet-wheel is a forked lever 22, loosely mounted upon the shaft, which lever carries a pivoted spring-actuated dog or pawl 23, which engages with the teeth of the ratchet-wheel.

It will be observed that when the levers are pulled down in the direction of the arrows in Fig. 1 the dogs 23 turn the ratchet-wheels and their shafts in a direction to effect the raising of the gate, and when the levers are again raised the dogs ride over the teeth of the ratchet-wheels and will again engage said teeth upon the next downward stroke of the levers to again turn the shafts and raise the gate a short distance, and this operation of the parts is repeated until the gate is raised the required height to permit of the flow of the water along the sluice.

In order to prevent the downward movement or falling of the gate during the time that the levers are raised into position preparatory to making another effective stroke, we provide levers or pawls 24, pivoted to the horizontal pieces 25, bracing the guide-standards, the inner ends of which levers or pawls engage the teeth of the ratchet-wheels to prevent retrograde movement thereof, said pawls being held in engagement with the ratchet-wheels by reason of being pivoted adjacent to the point of engagement with the ratchets, thereby providing a longer and weightier portion which throws the inner shorter arm upwardly into engagement with said ratchets.

Hung from the outer ends of the pawls by cords or ropes 27 are weights 26, which during the raising of the gate are placed upon the platforms to thereby permit the pawls to engage the ratchets; but when it is desired to allow the gate to fall to close the sluice said weights are thrown off the platform, thereby drawing the outer ends of the pawls upwardly, causing their inner ends to release the ratchets, and thus the gate will fall by gravity. The cords, it will be noted, pass upwardly through openings 28 in the platforms.

In operation, when the levers 22 are operated simultaneously to raise the gate the pressure of the water upon the lower portion of the gate will swing the same upon its shaft in the direction of the flow of the water to permit of the floating of the logs through the sluice without jamming, and the gate is continued to be raised by the hereinbefore-described devices until it reaches the desired height.

To lower the gate, the weights 26 are thrown off the platforms, which causes the pawls to release the ratchets and the gate then falls into its position indicated in Figs. 1, 3, and 5.

In practice it will be found that the raising of the gate may be effected by two ordinary-sized men or two stout boys, and the device will be found especially advantageous where it is impracticable or too costly to construct a dam.

It will also be found that our device is simple in its construction and at the same time may be cheaply built, and it will be found to be durable and well adapted for the purposes in view.

Many changes may be made in the details of construction and arrangement of parts without departing from the principle of the invention or sacrificing any of its advantages.

Having thus described our invention, what we claim, and desire to secure by Letters Patent, is—

1. The combination with a sluice, of standards carried thereby, uprights adapted to slide vertically within said standards, a flood gate rotatably supported by said uprights and adapted to move vertically therewith, means for raising said gate and its supporting uprights, and locking levers pivoted to the standards and projecting through openings therein to adapt said levers to lock the gate and its uprights from movement as described.

2. The combination with a sluice, of standards carried thereby, uprights adapted to slide vertically within said standards, a flood-gate, a shaft upon which said gate is mounted, said shaft having its bearings in said uprights, means for raising said gate and its supporting uprights and the shaft, levers pivoted to the standards and projecting through openings therein to adapt said levers to lock the gate and its uprights from movement, for the purpose specified.

3. The combination with a sluice, of standards carried thereby, uprights adapted to slide within said standards, a flood gate rotatably supported by said uprights, means for raising said gate and its supporting uprights, levers pivoted to the standards and adapted to project through openings therein to lock the gate and its uprights from movement, said standards being provided with openings below said levers to adapt an implement to be inserted therethrough and to raise the gate uprights, for the purpose specified.

4. The combination with a sluice, of standards carried thereby, uprights adapted to slide within said standards, a flood gate rotatably supported by said uprights, and means for raising the gate and uprights consisting of racks secured to said uprights, gear wheels meshing with said racks, ratchet wheels on the shafts of said gear wheels, levers provided with pawls or dogs engaging said ratchet wheels, platforms carried by the standards, and pivoted pawls adapted to normally engage said ratchets to prevent retrograde movement thereof, cords or ropes secured to said pawls and passing upwardly through the platforms, and weights secured to said cords or ropes, all adapted to co-operate in the manner specified.

5. The combination with a sluice, standards carried thereby, uprights adapted to slide within said standards and means for raising said uprights, of a flood gate rotatably supported by said uprights, and comprising a series of boards arranged lengthwise, centrally arranged braces secured to said boards, rods arranged lengthwise of the gate and passing over the braces and secured at opposite ends to the ends of the gate and rubber belting secured to the gate at its edges, for the purpose specified.

6. The combination with a sluice, of standards carried thereby and provided with grooves, uprights fitting and adapted to slide in said grooves, a shaft having bearings in said uprights, a flood gate mounted on said shaft, racks secured to the uprights upon opposite sides thereof, platforms secured to the standards, bearing blocks secured also to said standards at their upper ends, horizontal shafts mounted in said blocks, gear wheels on said shafts and meshing with the racks, ratchet wheels on projecting ends of the shafts, levers pivoted upon the shafts, dogs pivoted to the levers and engaging the said ratchet wheels, pawl levers pivoted intermediate their ends to adapt the inner ends thereof to normally be raised and to engage the said rachets to prevent retrograde movement thereof, cords or ropes secured to the outer ends of the said pawl levers and passing upwardly through the platforms, weights secured to said cords or ropes, substantially as described.

In testimony whereof we affix our signatures in presence of two witnesses.

GEORGE BRUCE.
CHAS. L. VAN BUSKIRK.

Witnesses:
JAS. B. WADE,
GEO. W. LE MOIN.